United States Patent [19]

Cretser

[11] Patent Number: 4,823,940
[45] Date of Patent: Apr. 25, 1989

[54] FLAT ARTICLE CONVEYOR

[75] Inventor: Richard Cretser, Willseville, N.Y.

[73] Assignee: Schuyler Dynamics, Trumansburg, N.Y.

[21] Appl. No.: 144,091

[22] Filed: Jan. 15, 1988

[51] Int. Cl.[4] ............................................. B65G 15/10
[52] U.S. Cl. .................................... 198/817; 198/840
[58] Field of Search ............... 198/817, 626, 627, 840, 198/847, 389

[56] References Cited

U.S. PATENT DOCUMENTS

| 3,086,822 | 4/1963 | Fibish | 198/389 |
| 3,193,085 | 7/1965 | Whipple | 198/817 |
| 3,482,676 | 12/1969 | Fackler | 198/847 |
| 3,706,369 | 12/1972 | Ishida et al. | 198/626 |
| 4,014,428 | 3/1977 | Ossbahr | 198/626 |
| 4,542,820 | 9/1985 | Maxner | 198/817 |

Primary Examiner—Joseph E. Valenza
Attorney, Agent, or Firm—Nixon & Vanderhye

[57] ABSTRACT

A conveyor for transporting flat articles, e.g., printed circuit boards, between manufacturing workstations includes laterally spaced endless belts disposed about pulleys at opposite ends of the conveyor at each side thereof. The belts lie on edge, having a height dimension greater than their width dimension. The upper edges of the belts are beveled to facilitate transfer of flat articles from one conveyor section to the next. The articles are conveyed on the upper flat edges of the conveyor belts. The axes of rotation of the pulleys at opposite ends of the conveyor converge downwardly and longitudinally toward one another by locating the single bearing race of each pulley above the central longitudinal axis of the belt. In this manner, the pulley axes converge downwardly and longitudinally toward one another such that the belts are biased for engagement along guide surfaces disposed between the belts and the flanges on the lower ends of the pulleys, freeing the upper ends of the pulleys from obstructions.

18 Claims, 3 Drawing Sheets

FLAT ARTICLE CONVEYOR

BACKGROUND AND SUMMARY OF THE INVENTION

The present invention relates to a flat article conveyor and particularly relates to a conveyor for use in conjunction with automated circuit board manufacturing equipment where conveyors typically transport circuit boards between individual workstations.

In many manufacturing processes, it is conventional to transport an article between various workstations where different types of machines perform various operations on the article undergoing manufacture. For example, in the manufacture of printed circuit boards, many specialized manufacturing operations are performed at various and different workstations. Frequently, however, the boards are transported manually between the workstations. At each workstation, an operator typically removes a board from an input tote box, loads the board into the machine's fixture, waits for the machine to perform its specialized operation on the board and then removes the board from the fixture and disposes it into an output tote box. The tote boxes are, of course, manually moved between the workstations and this sequence of operations is repeated at each of the various workstations.

Automatic conveyance of articles between workstations is, of course, not new per se. However, specialized problems occur in efforts to convey articles, for example, printed circuit boards, in the automated manufacture thereof. For example, it is desirable that the boards be movable bi-directionally and with accuracy into predetermined positions after such movement. The magnitude and direction of forces acting on the moving circuit board must be maintained within predetermined levels. Access to the top and bottom of the boards must be virtually unlimited. Also, transfer problems occur when boards are transferred from one conveyor to the next or from one workstation to a conveyor or the converse. Such problems include boards jamming in the conveyor or electrostatic charge build-up on the board and sudden electrical discharge, which may cause damage to the circuit components of the board. Modularity of system components for serviceability and flexibility, together with low complexity and cost, are also considerations which must be addressed in the provision of a flat article conveyor of the type for transporting printed circuit boards.

One example of a prior flat article conveyor for conveying printed circuit boards between manufacturing workstations is described and illustrated in U.S. Pat. No. 4,561,819, issued Dec. 31, 1985. That patent alludes to various types of conveyors, for example, belt conveyors, push/pull devices, chain conveyors, and vibration conveyors, all of which have been used in the past and have met with limited degrees of success in minimizing or eliminating the foregoing and other problems associated with the conveyance of flat articles, e.g., printed circuit boards.

According to the present invention, there is provided a flat article conveyor particularly adapted for the conveyance of printed circuit boards between various types of workstations. More particularly, the conveyor hereof includes a pair of endless conveyor belts on respective opposite sides of the conveyor, each belt being disposed about pulleys or rollers at respective opposite ends of the conveyor. Inside portions of the belts are thus spaced laterally one from the other and serve as transport mechanism for the boards. In accordance with a particular aspect of this invention, the belts are disposed on edge and for movement about pulleys having substantially vertical axes adjacent opposite ends of the conveyor. Thus, each belt has a height dimension greater than its width dimension, the width dimension being transverse to the direction of movement of the conveyor and in the plane of movement of the articles along the conveyor. The opposite lateral edges or margins of the printed circuit boards rest on the upper edges of the laterally spaced belts.

The pulleys at opposite ends of each conveyor section on opposite sides of the conveyor have laterally outwardly projecting flanges at their lower ends for engaging and guiding the lower edge of the associated belt. The upper portions of the pulleys are otherwise free of projecting flanges or guides such that the area above the upper belt edge, particularly adjacent the pulleys, is free to support a margin of the printed circuit board on the conveyor. For reasons outlined in detail hereinafter, the upper edge of each belt is beveled or inclined in an outward and downward direction away from the pulleys, the beveled upper edges of the belts underlying the circuit boards supported therebetween on the upper edges of the belt.

The belts are preferably formed of a fiberglass-reinforced conductive rubber to provide a high coefficient of friction between the conveyor belts and the conveyed circuit board. This eliminates any need for pusher-type devices or squeezing or clamping of the board while the board is moving along the conveyor. Also, with such high coefficient of friction, the board may be transported in opposite directions simply by reversing the direction of the conveyor. It will be appreciated that the high coefficient of friction between the belt and the board, together with the known acceleration/deceleration profile of the belts, also affords accurate positioning of the board after rapid movement and prevents loss of registration of board position relative to belt position. Consequently, the acceleration and deceleration forces acting on the board may be maintained within predetermined levels.

Additionally, the on-edge conveyor belts are provided with upstanding, generally U-shaped, guides which receive the inner runs of the belts between the pulleys. The upstanding legs of the U-shaped guides between the belts terminate short of the upper edges of the belts so that the printed circuit board may be transported on the belt edge. The other upstanding legs of the guides within each endless belt extend upwardly above the upper belt edges to afford lateral guides for the printed circuit boards.

By providing a belt-on-edge configuration and mounting the boards on the upper thin edge of the belts, maximum access to the upper and lower surfaces of the boards is obtained. This is significant in certain printed circuit board manufacturing operations. Additionally, the beveled upper edge of the belt facilitates transfer of boards or flat articles from one conveyor to the next conveyor. More particularly, if adjacent transfer conveyors are slightly misaligned one with the other, either elevationally or laterally, the beveled configuration facilitates the transfer of boards from the feed conveyor to the receiving conveyor. For example, while conveyors of this type are normally disposed at the same elevation, it is possible due to different tolerances for the receiving conveyor to be slightly higher than the feed conveyor. In those circumstances, the board advances from the feed conveyor into contact with the beveled edges of the receiving conveyor. Those beveled edges assist in displacing the board vertically upwardly onto the flat upper edges of the belts of the receiving conveyor. Typically, of course, there is no problem if the receiving conveyor is slightly below the elevation of the discharging conveyor. The beveled edges also facilitate in much the same manner the transfer of boards which are warped from one conveyor to the next and whether or not the conveyers are misaligned.

As a further example, if adjacent conveyors are laterally misaligned, the longitudinally adjacent pulleys of the feed and receiving conveyors have heights which extend above the upper edge of the belts. Upon slight lateral misalignment of these conveyors, the leading edge or corner of the circuit board edge on one side of the discharge conveyor will engage the portion of the pulley on the corresponding side of the receiving conveyor above the belt thereof. The rotation of the receiving pulley tends to displace the board toward the center of the conveyor and align it between the side guides of the conveyor.

A further feature of the present invention resides in the bias applied to the belts to maintain the belts in contact with the underlying guides and the flanges of the pulleys. This enables the upper edges of the belts to remain free and unobstructed to receive the margins of the printed circuit boards. To achieve this, the axes of rotation of the pulleys on each of the opposite sides of the conveyor are slightly misaligned such that they converge towards one another below the conveyor. This causes the belts to bear or track against the bottom guides and the pulley flanges. This convergence of rotational axes may be accomplished by mounting each pulley for rotation about a single bearing carried by a pulley hub and located above the longitudinal centerline of the belt. Consequently, when the belt is driven, an off-center load is placed on the bearing, causing the bearing to shift to the loaded side of its raceway. This enables the outer race of the bearing and hence the pulley to rotate about an axis angularly related to the axis of the inner bearing race which is true vertical. Consequently, the outer races and, hence, the pulleys of each conveyor section, cant toward one another to provide downwardly slightly convergent axes of rotation. Thus, the entire upper edge of each belt is free for use as a support surface for the margin of the board obviating the need for upper belt guides or pulley flanges. That is, the belts are maintained seated against their underlying guides.

Additionally, by using conductive elastomer belts, conductive polymer belt guides, metal guide rollers and support frames, continuous bleed-off of any accumulated static electrical charge is assured. Additionally, the conveyors may be provided in usable sections of predetermined length, for example, on the order of 18 to 36 inches per section. Consequently, this modular aspect provides for individual positioning of the board and individual conveyor module serviceability.

Accordingly, in accordance with a preferred embodiment of the present invention, there is provided a conveyor for transport of articles having opposite side edges, comprising a flexible endless conveyor belt disposed along one side of the conveyor and spaced laterally from the opposite side of the conveyor, the belt extending generally parallel to the direction of travel along the conveyor, a pair of rollers mounted adjacent opposite ends of the conveyor for rotation about spaced, generally vertical, axes, the belt extending about the rollers and having, in cross-section, a depth dimension greater than its width dimension for supporting articles along its upper surface, the upper surface and the side of the belt closest to the opposite side of the conveyor being beveled to provide an inwardly facing beveled surface along the longitudinal extent of the belt.

In another preferred embodiment hereof, there is provided a conveyor for transport of articles having opposite side edges, comprising a flexible endless conveyor belt disposed along one side of the conveyor and spaced laterally from the opposite side of the conveyor, the belt extending generally parallel to the direction of travel along the conveyor, a pair of rollers mounted adjacent opposite ends of the conveyor for rotation about spaced, generally vertical, axes, the belt extending about the rollers and having, in cross-section, a depth dimension greater than its width dimension for supporting articles along its upper surface, a guide surface underlying the belt, the guide surface defining an elongated groove for receiving the belt with the height of the guide surface along the inside face of the conveyor belt being less than the depth dimension of the belt.

Accordingly, it is a primary object of the present invention to provide a novel and improved flat article conveyor which affords bi-directional movement and accuracy of positioning of the article, maximizes access to the top and bottom areas of the article, facilitates transfer of the article from adjacent in-line conveyors, as well as drain of any electrostatic charge from the articles being conveyed, provides modularity of system components and minimizes complexity and cost.

These and further objects and advantages of the present invention will become more apparent upon reference to the following specification and appended claims and drawings.

BRIEF DESCRIPTION OF THE DRAWING FIGURES

DESCRIPTION OF A PREFERRED EMBODIMENT

Reference will now be made in detail to the present preferred embodiment of the invention, an example of which is illustrated in the accompanying drawings.

Figure 1:
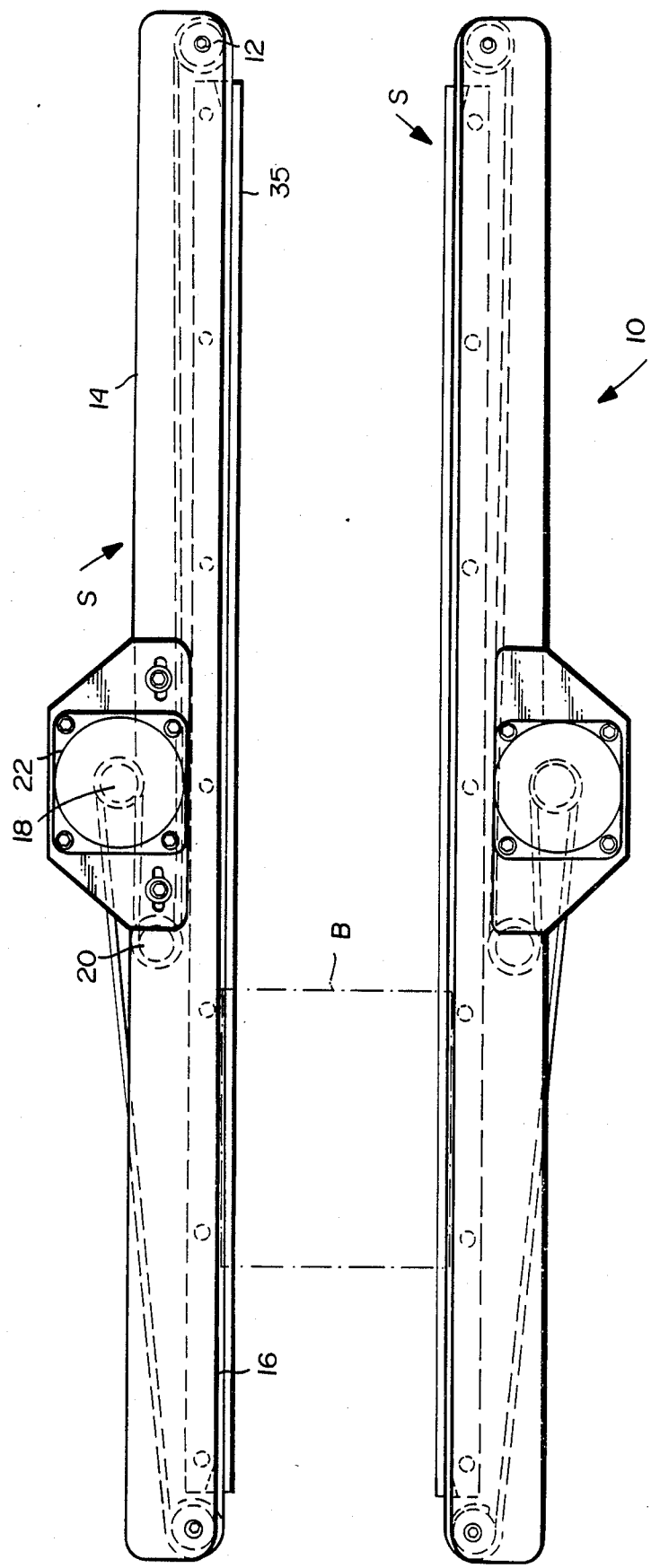
FIG. 1 is a plan view of a flat article conveyor constructed in accordance with the present invention.

Referring now to the drawings, particularly to FIG. 1, there is illustrated a conveyor, generally designated 10, constructed in accordance with the present invention. Conveyor 10 has a discrete length, for example, on the order of 18 to 36 inches, and may be disposed in line with other conveyors of a similar or dissimilar nature or with manufacturing equipment at workstations, not shown, which perform work on the article being conveyed, in this instance, a printed circuit board, designated B. Each conveyor 10 may comprise laterally opposite conveyor sections S which may be mirror images one of the other. Referring now to both FIGS. 1 and 2, each conveyor section S includes a pair of end pulleys or rollers 12 mounted for rotation about generally vertical axes in a generally elongated frame 14. An endless conveyor belt 16 is disposed about end pulleys 12 and about a drive pulley 18 and a take-up pulley 20. A stepper motor 22 is disposed to drive pulley 18.

Figure 2:
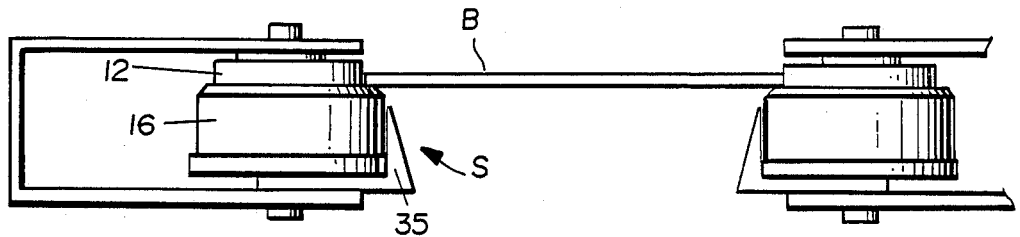
FIG. 2 is a fragmentary end view of the flat article conveyor illustrated in FIG. 1.
Figure 3:
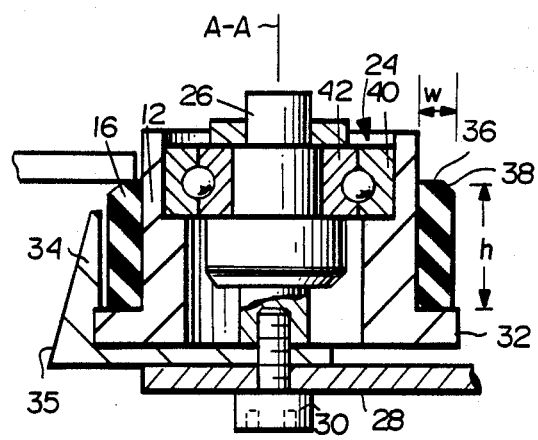
FIG. 3 is a fragmentary enlarged cross-sectional view of the righthand pulley illustrated in FIG. 2.

From a review of FIGS. 1 and 2, it will be appreciated that each endless belt 16 is disposed on its edge such that its height dimension is substantially greater than its width direction, the height and width dimensions being best illustrated in FIG. 3 by the designations h and w, respectively. Thus, the pair of endless belts 16 are spaced one from the other laterally across conveyor 10 such that the flat sides of the belt lie in opposition and lateral registry each with the other. The article B is disposed between the conveyor sections S such that the lateral margins along its underside bear on the upper edges of belts 16.

Referring now particularly to FIG. 3, each of the pulleys 12 is mounted for rotation about a generally vertical axis A.A. by a single ball bearing arrangement, generally designated 24, described in detail below. The inner race of ball bearing 24 is mounted on a hub 26 secured to a rigid structure or frame 28 by suitable means, such as a bolt 30. Importantly, each pulley 12 has a lower, laterally outwardly projecting flange 32 forming a lower guide surface for the lower edge of the associated pulley 12. Pulley 12 is otherwise clear of any other flanges or guides surfaces such that access to the upper edge of the belt may be provided.

For supporting and guiding the belt 16 between the end pulleys 12 of each conveyor section S, there is provided an upstanding generally U-shaped guide 34. Guide 34 is secured to the frame 14 and forms an elongated groove extending between end pulleys 12. The lower edge of the belt 16 rests on the base of segment 34 as the belt advances. The legs 35 of the guides 34 extend upwardly to straddle the belt. The inner leg 35 of each U-shaped guide terminates short of the upper edge of the belt. The other leg 37 of each guide 34 extends above the upper edge of the associated belt to guide the board B along the conveyor.

As will be apparent from the foregoing and a review of FIG. 3, the upper edge of each belt 16 is beveled at 38. Bevel 38 inclines inwardly and downwardly from upper edge 36 along the inside run of the belt in a direction toward the laterally opposite belt 16 of the opposite conveyor section.

Figure 4:
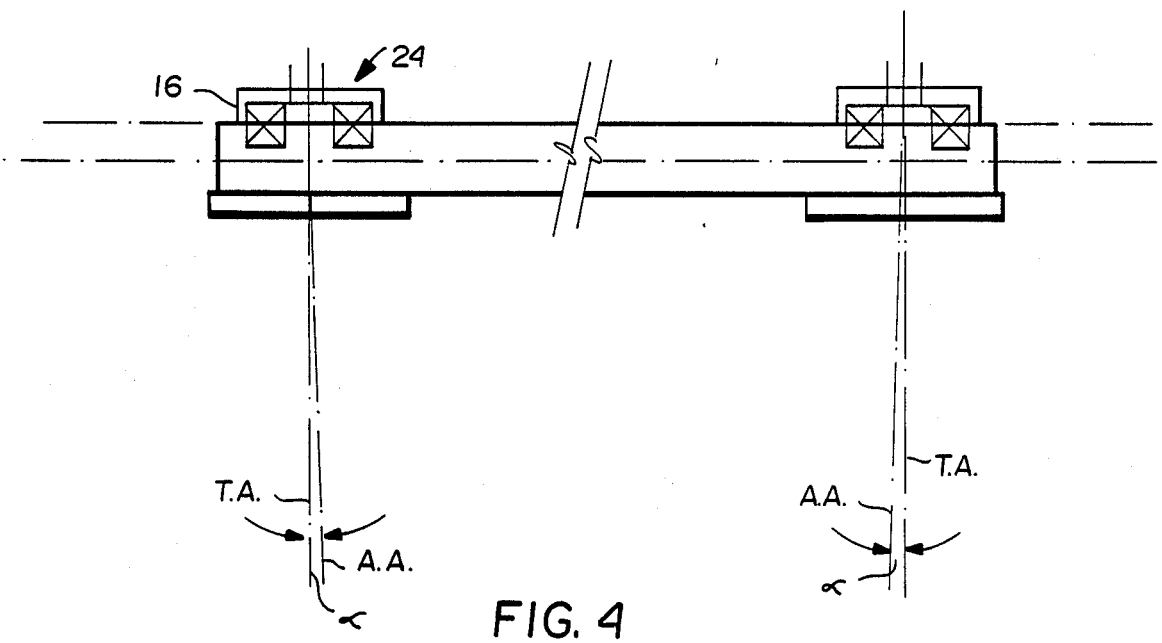
FIG. 4 is a schematic illustration of the arrangement of the pulley axes along one side of the conveyor.

Referring now to FIG. 4, there is schematically illustrated the bearings 24 for pulleys 12. It will be appreciated that bearings 24 are each located above a medial plane passing normal to the axis of rotation of the pulley and above the longitudinal centerline of the associated belt. It will also be appreciated that the outer race 40 (FIG. 3) of bearing 24 is secured to pulley 12 and that there is a tolerance between the outer and inner races 40 and 42, respectively. In the absence of an additional bearing, this tolerance enables pulley 12 to be canted such that its true axis of rotation is slightly offset from the vertical. With belt 16 tensioned about the pulleys, the pulleys will cant in the direction of belt tension such that, as illustrated in FIG. 4, the actual axes of rotation A.A. of the pulley 12 are about axes offset from true vertical (the true vertical axes being designated in FIG. 4 at T.A.). Axes A.A. therefore converge toward one another. The angle of offset of axes A.A. from the vertical is illustrated at a in FIG. 4. In this manner, the belt is maintained in engagement against the guide surfaces of the hubs, i.e., the flanges 32, and the base of U-shaped guides 34 such that the upper edges of the belts 36, on which the articles are transported, lie in a common horizontal plane as the belts move about the pulleys from end to end of the conveyor.

As noted hereinbefore, the belts are formed of a fiberglass-reinforced rubber. To maintain the upper edges of the belts in a common horizontal plane, the upper and lower edges of the belts are ground. In this manner, the upper and lower belt edges will lie in parallel planes and irregularities in the manufacture of the belts are avoided.

Figure 5:
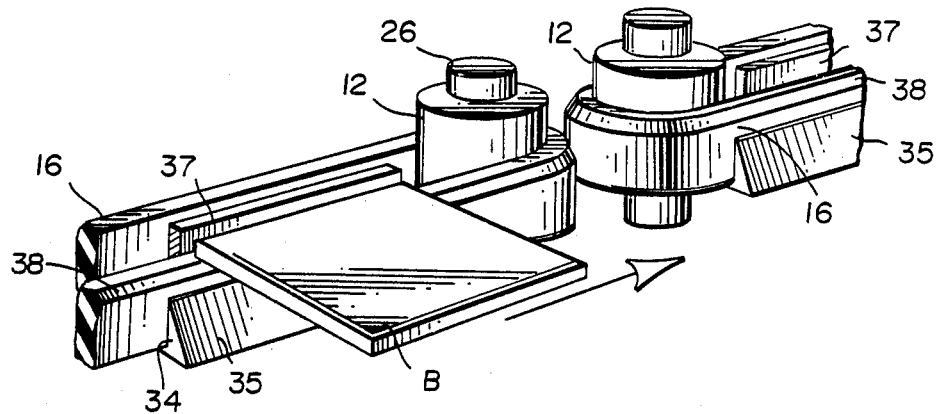
FIG. 5 is a fragmentary perspective view illustrating a transfer of an article from one conveyor section to the next along one side of the conveyor.
Figure 6:
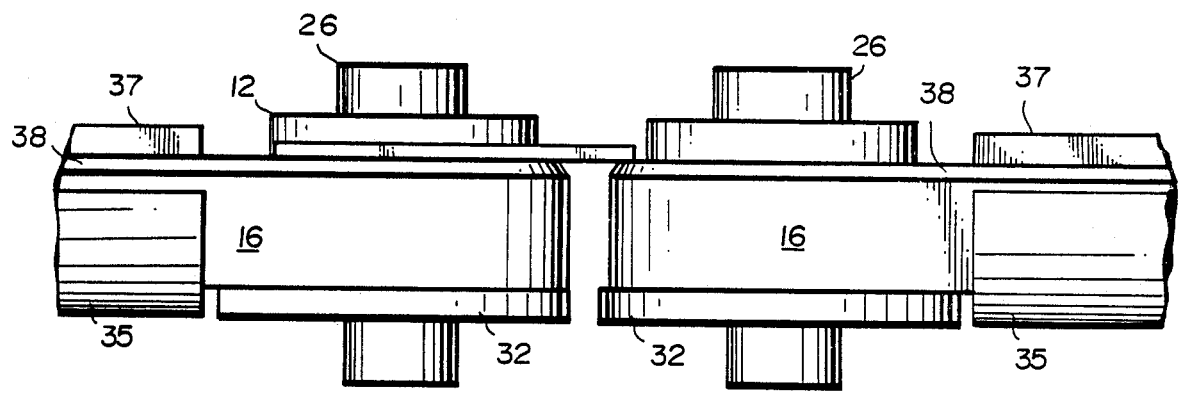
FIG. 6 is an enlarged side elevational view of the pulleys illustrated in FIG. 5.

Referring now to FIGS. 5 and 6, there is illustrated one side of the sections of two conveyors disposed end-to-end whereby transfer of the article B may be effected from a feed conveyor onto a receiving conveyor, the articles B moving in the direction of the arrow illustrated in FIG. 5. As indicated previously, the conveyors disposed end-to-end as illustrated normally lie at a common elevation and are aligned laterally. However, there are instances where there are minor differences in elevation or lateral alignment of the feed and receiving conveyors due to tolerances in the set-up of the conveyors. By providing the beveled edge 38 on belts 16, the transfer of the article B from the feed conveyor to the receiving conveyor is facilitated.

For example, if there is a slight misalignment in the location of the feed and receiving conveyors such that the receiving conveyor is elevated slightly above the elevation of the feed conveyor, the forward or leading edge of the article B as it is transferred from the feed conveyor strikes or engages the beveled edges 38 of the belts 16 of the receiving conveyor. When the leading edge of the board strikes the beveled edge of the belts of the receiving conveyor, those beveled edges tend to lift the article as the belts advance, displacing the article upwardly such that its margin rests on the upper edges 36 of the belts rather than continue to engage the beveled edges. That is, the leading edge of the article engages the beveled edge 38 of the belts of the receiving conveyor as those belts are transposed from their curved condition about the pulley into the linear condition between the pulleys. This tends to elevate the article.

Similarly, should the article be warped, the same action occurs in the course of the transfer from the feed to the receiving conveyors. Consequently, even though adjacent-in-line transfer conveyors may be acurately aligned both elevationally and laterally one with the other, a warped article B may have its forward or leading edge drop downwardly as it leaves the feed conveyor prior to being engaged by the belts of the receiving conveyor. That edge, however, will strike the beveled edge of the belts of the receiving conveyor and a similar lifting action will occur.

Similarly, if slight lateral misalignment occurs between feed and receiving conveyor sections, one of the forward edges or corners of the board B will engage the corresponding pulley 12 on the same side of the receiving conveyor above the upper edge of its belt. The inside surface of the pulley is moving in the direction of travel and tends to shift the circuit board B laterally into a centered alignment on the receiving conveyor. From the foregoing, it will be appreciated that jamming between feed and receiving conveyors is substantially eliminated by the use of belts having beveled surfaces and arranged on pulleys in the manner indicated.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A conveyor for transport of articles having opposite side edges, comprising:
    a flexible endless conveyor belt disposed along one side of the conveyor and spaced laterally from support means on the opposite side of the conveyor, said belt extending generally parallel to the direction of travel along the conveyor;
    a pair of rollers mounted adjacent opposite ends of the conveyor for rotation about spaced, generally vertical, axes, said belt extending about said rollers and having, in cross-section, a depth dimension greater than its width dimension for supporting articles along its upper surface thereby to maximize access to the under surface of the articles carried by the conveyor;
    a guide surface for said belt, said guide surface defining an elongated groove for receiving said belt with the upper most portion of said guide surface along the outside face of said conveyor belt being lower than the upper surface of said belt, a portion of said guide surface underlying said belt, and means for mounting said belt with respect to said rollers for biasing said belt for movement about said rollers in a generally vertically downward direction maintaining said belt in engagement with said underlying portion of said guide surface.

2. A conveyor according to claim 1 wherein said biasing means includes at least one roller mounted such that said belt moves about axes defined by said rollers which converge toward one another below said belt.

3. A conveyor according to claim 1 wherein said support means includes a second flexible endless conveyor belt disposed along said opposite side of the conveyor, said second belt extending generally parallel to the direction of travel along the conveyor, a second pair of rollers mounted adjacent opposite ends of the conveyor for rotation about spaced, generally vertical, axes and along said opposite side of the conveyor, said second belt extending about said rollers and having, in cross-section, a depth dimension greater than its width dimension for supporting articles along its upper surface, a second guide surface for said belt, said second guide surface defining an elongated groove for receiving said second belt with the uppermost portion of said second guide surface along the outside face of said second conveyor belt being lower than the upper surface of said second belt.

4. A conveyor according to claim 1 wherein said belt is formed of a conductive rubber material.

5. A conveyor according to claim 3 wherein the uppermost portion of said first and second guide surfaces along the opposite faces of the first and second conveyor belts extend above the upper surfaces of the first and second conveyor belts, respectively, to provide lateral guides for the article on said first and second belts.

6. A conveyor for transport of articles in a predetermined direction, the conveyor having opposite sides, comprising:
    a flexible endless conveyor belt disposed along one side of the conveyor and spaced laterally from support means on the opposite side thereof;
    a pair of rollers along one side and adjacent opposite ends of the conveyor for rotation about spaced, generally vertical, axes, said endless belt extending about said rollers in a generally horizontal plane and having an endless generally flat, horizontally extending, upper surface for supporting articles along said one side of the conveyor, said belt, in cross-section, having a depth dimension greater than its width dimension and an endless bevelled surface extending between said flat upper surface and the outer side of the belt such that the bevelled surface along the run of said belt closest to the opposite side of the conveyor underlies articles supported by the conveyor along said flat upper surface for facilitating receipt of articles on said flat upper surface at an upstream end of said belt.

7. A conveyor according to claim 6 including a guide underlying said belt and means for biasing said belt for movement about said rollers in a generally vertically downwardly direction maintaining said belt in engagement with said underlying guide.

8. A conveyor according to claim 7 wherein said biasing means includes means mounting at least one roller such that its rotational axis extends toward the rotational axis of the other roller below said belt.

9. A conveyor according to claim 8 wherein said mounting means comprises solely a single bearing carried by said one roller and disposed above the median of the depth dimension of said belt.

10. A conveyor according to claim 6 including means defining a guide surface for said belt comprising an elongated groove for receiving said belt with the uppermost portion of said guide surface along the outside face of said conveyor belt along said run being lower than the flat upper surface of said belt.

11. A conveyor according to claim 10 wherein the uppermost portion of said guide surface along the inside face of said conveyor belt along said run extends above the upper surface of said belt to provide a lateral guide for the article disposed on said upper belt surface.

12. A conveyor according to claim 6 wherein said support means includes a second flexible endless conveyor belt disposed along said opposite side of the conveyor, a second pair of rollers along the opposite side and adjacent opposite ends of the conveyor for rotation about spaced, generally vertical, axes, said second belt extending about said second rollers in said generally horizontal plane and having an endless generally flat, horizontally extending upper surface for supporting articles along said opposite conveyor side, said second belt, in cross-section, having a depth dimension greater than its width dimension and an endless bevelled surface extending between said flat upper surface and the outer side of said conveyor belt such that the bevelled surface of said second belt along the run thereof closest to said one conveyor side underlies articles supported by the conveyor along said flat upper surface thereof.

13. A conveyor according to claim 12 including guides underlying said belts, and means for biasing said belts for movement about said rollers in generally vertically downward directions maintaining said belts in engagement with the corresponding underlying guides.

14. A conveyor according to claim 13 wherein said biasing means includes means mounting at least one roller in each pair thereof such that the rotational axis of said one roller extends below said belt toward the rotational axis of the other roller in said pair thereof.

15. Apparatus according to claim 12 including
a second conveyor disposed in end-to-end relation to the first mentioned conveyor for transporting articles therealong, said second conveyor comprising a pair of flexible endless conveyor belts disposed along opposite sides thereof and in a generally horizontal plane, said belts of said second conveyor extending generally parallel to the direction of travel of articles along said second conveyor;
a pair of longitudinally spaced rollers mounted on each of the opposite sides of said second conveyor for rotation about spaced, generally vertical, axes, each said second endless belts of said second conveyor extending about a pair of said rollers on opposite sides of said second conveyor in said generally horizontal plane and having an endless, generally flat, horizontally extending, upper surface for transporting articles along said second conveyor, said belts of said second conveyor, in cross-section, having depth dimensions greater than their width dimensions and endless bevelled surfaces extending between their flat upper surfaces and their outer sides such that the bevelled surfaces along the runs thereof closes to one another underlie articles transported by the second conveyor along their flat upper surfaces 16. A conveyor according to claim 6 wherein said conveyor has an article receiving end, a second conveyor having an article discharge end, said second conveyor disposed in end-to-end relation to the first mentioned conveyor such that articles discharged from said second conveyor are received on said first conveyor at said upstream end of said belt, said second conveyor having article support surfaces at its discharge end at an elevation below said generally horizontal plane such that the articles may engage the bevelled surface of said endless belt upon discharge from the second conveyor onto the first conveyor to facilitate movement of the article onto the upper surface of the belt of said first conveyor.

17. A conveyor according to claim 12 wherein said conveyor has an article receiving end, a second conveyor having an article discharge end, said second conveyor disposed in end-to-end relation to the first mentioned conveyor such that articles discharged from said second conveyor are received on said first conveyor at said upstream end of said belt, said second conveyor having article support surfaces at its discharge end at an elevation blow said generally horizontal plane such that the articles may engage the bevelled surfaces of said endless belts upon discharge from the second conveyor onto the first conveyor to facilitate movement of the article onto the upper surfaces of the belts of said first conveyor.

18. A conveyor according to claim 9 wherein said bearing comprises inner and outer races having a limited degree of play therebetween, the tension on said belt cooperating with the bearing races such that the bearing play causes the belt to be biased for movement in a downward direction.

* * * * *